United States Patent
Peruzzotti et al.

(10) Patent No.: US 10,807,500 B2
(45) Date of Patent: Oct. 20, 2020

(54) HANGER WIRES FOR CONTACT WIRES OF RAILWAY ELECTRICAL LINES

(71) Applicant: COPPERWELD BIMETALLICS LLC, Fayetteville, TN (US)

(72) Inventors: Franco Peruzzotti, Legnano (IT); Antonio Pezzoni, Cerro Maggiore (IT); Dustin Fox, Brentwood, TN (US); Yance Syarif, Brentwood, TN (US)

(73) Assignee: COPPERWELD BIMETALLICS LLC, Fayetteville, TN (US)

( * ) Notice: Subject to any disclaimer, the term of this patent is extended or adjusted under 35 U.S.C. 154(b) by 189 days.

(21) Appl. No.: 14/427,594

(22) PCT Filed: Sep. 17, 2013

(86) PCT No.: PCT/IB2013/058618
§ 371 (c)(1),
(2) Date: Mar. 11, 2015

(87) PCT Pub. No.: WO2014/045201
PCT Pub. Date: Mar. 27, 2014

(65) Prior Publication Data
US 2015/0246623 A1 Sep. 3, 2015

(30) Foreign Application Priority Data
Sep. 18, 2012 (IT) .............................. MI2012A1545

(51) Int. Cl.
*B60M 1/23* (2006.01)
*D07B 1/14* (2006.01)
(Continued)

(52) U.S. Cl.
CPC ................ *B60M 1/23* (2013.01); *D07B 1/02* (2013.01); *D07B 1/147* (2013.01);
(Continued)

(58) Field of Classification Search
CPC . B60M 1/23; D07B 1/02; D07B 1/147; D07B 2001/2009; D07B 2201/2011; D07B 2205/3067; D07B 2205/3085
See application file for complete search history.

(56) References Cited

U.S. PATENT DOCUMENTS

| | | | | | |
|---|---|---|---|---|---|
| 569,827 | A | * | 10/1896 | Henry ........................ | B60L 5/06 191/34 |
| 1,691,869 | A | * | 11/1928 | Fowle ....................... | H01B 5/08 174/122 C |

(Continued)

FOREIGN PATENT DOCUMENTS

| | | |
|---|---|---|
| AT | 373214 B | 12/1983 |
| GB | 304031 A | 1/1929 |

(Continued)

OTHER PUBLICATIONS

Copper Conductors for Overhead Lines, G. W. Prestonf and H. G. Taylor, Apr. 12, 1944 (Year: 1944).*

(Continued)

*Primary Examiner* — Paresh H Paghadal
(74) *Attorney, Agent, or Firm* — Sheppard, Mullin, Richter & Hampton LLP

(57) ABSTRACT

A hanger wire for contact wires of railway electrical lines may include: first wires including copper or a first alloy of copper; and second wires including a steel core coupled with a layer of copper or a second alloy of copper. An overhead contact line suitable to transmit electric power to a locomotive may include: at least one conductor element connected to a high voltage electric energy distribution network; at least one suspension wire fastened to a series of supporting poles arranged along the overhead contact line; and a plurality of hanger wires connecting the at least one conductor element to the at least one suspension wire. The hanger wires may include: first wires including copper or a (Continued)

first alloy of copper; and second wires including a steel core coupled with a layer of copper or a second alloy of copper.

8 Claims, 5 Drawing Sheets

(51) Int. Cl.
*D07B 1/02* (2006.01)
*H01B 5/08* (2006.01)
(52) U.S. Cl.
CPC ............. *D07B 2201/2009* (2013.01); *D07B 2201/2011* (2013.01); *D07B 2205/3067* (2013.01); *D07B 2205/3085* (2013.01); *H01B 5/08* (2013.01)

(56) References Cited

U.S. PATENT DOCUMENTS

| | | | |
|---|---|---|---|
| 1,816,413 A | 7/1931 | Hanger | |
| 4,689,444 A * | 8/1987 | Burgess | H01B 5/08 174/128.1 |
| 4,745,002 A * | 5/1988 | Vexler | C23C 4/12 427/120 |
| 4,810,593 A * | 3/1989 | Yamamoto | B32B 15/012 148/532 |
| 5,087,300 A * | 2/1992 | Takayama | B21B 1/16 148/532 |
| 5,495,547 A * | 2/1996 | Rafie | E21B 17/206 340/854.7 |
| 6,307,156 B1 * | 10/2001 | Avellanet | B21C 37/045 174/128.1 |
| 2001/0000590 A1 * | 5/2001 | Valadez | H01B 7/0009 174/128.2 |
| 2003/0037957 A1 * | 2/2003 | Ueno | H01B 7/0009 174/128.1 |
| 2006/0000634 A1 * | 1/2006 | Arakawa | F21S 8/06 174/128.1 |
| 2008/0196926 A1 * | 8/2008 | Yang | H01B 7/0009 174/126.2 |
| 2009/0042052 A1 * | 2/2009 | Tsuda | D07B 1/0673 428/592 |
| 2009/0188231 A1 * | 7/2009 | Song | H05B 3/56 57/362 |
| 2009/0226691 A1 * | 9/2009 | Mankame | D07B 1/0673 428/222 |
| 2011/0122608 A1 * | 5/2011 | Napier | F21V 21/104 362/184 |
| 2012/0324858 A1 * | 12/2012 | Browne | D07B 1/0673 57/212 |
| 2013/0168127 A1 * | 7/2013 | Matsuno | H01B 7/0009 174/110 R |
| 2015/0184336 A1 * | 7/2015 | Chuang | D07B 1/10 361/679.56 |

FOREIGN PATENT DOCUMENTS

| | | |
|---|---|---|
| GB | 344194 | 3/1931 |
| GB | 344194 A | 3/1931 |
| GB | 775112 A | 5/1957 |
| JP | S57116516 | 7/1982 |

OTHER PUBLICATIONS

International Search Report PCT/ISA/210 for International Application No. PCT/IB2013/058618 dated Jun. 23, 2014.
Written Opinion of the International Searching Authority PCT/ISA/237 for International Application No. PCT/IB2013/058618 dated Jun. 23, 2014.
Communication Pursuant to Article 94(3) EPC dated Feb. 12, 2018 for European Application No. 13801745.4, 5 pages.
Examination Report dated Sep. 20, 2019 for Indian Application No. 2166/CHENP/2015.

\* cited by examiner

HANGER WIRES FOR CONTACT WIRES OF RAILWAY ELECTRICAL LINES

CROSS-REFERENCE TO RELATED APPLICATION(S)

This application is a national stage entry from International Application No. PCT/IB2013/058618, filed on Sep. 17, 2013, in the Receiving Office of the International Bureau of the World Intellectual Property Organization ("WIPO") and published as International Publication No. WO 2014/045201 A2, which claims priority from Italian Patent Application No. MI2012A001545, filed on Sep. 18, 2012, in the Italian Patent and Trademark Office, the entire contents of both of which are incorporated herein by reference.

The present invention concerns a hanger wire for contact wires of railway electrical lines that are suitable for transmitting electric power to a locomotive, in particular to the locomotive of a high-speed railway line.

As known, in order to transmit electric power to a locomotive equipped with an electric motor (for example the locomotive of a train, or also a tram or trolley bus) it is necessary to have an overhead contact line, also called conductor rail, provided with at least one threadlike conductor element (or "contact wire"), generally shaped and powered through connections to the electric energy distribution network at medium voltage (typically 3 kV in direct current for conventional lines and 25 kV in alternating current for high speed lines) and disposed along the railway line at an appropriate distance with respect to the locomotive. The latter is provided, at the top, with a device, known as a "pantograph" (in the case of trains) or "trolley" (in the case of a tram or trolley bus), which is capable of keeping constant electrical contact with the conductor element during the movement of the locomotive, so as to continuously receive the electric power from the overhead line with the purpose of powering the motor of the means itself and other on-board equipment, such as electric heating, conditioning and the other possible auxiliary devices. The pantograph is generally made up of a parallelogram with articulated arms that in the upper vertex sustains a shoe called "contact shoe" that is intended to come into contact with the conductor element of the overhead line. The contact shoe is made with weatherproof materials, with low friction coefficient and with good electrical conductivity. The contact wire, in reality, does not run linearly, but it is disposed in a zig-zag shape (so-called "staggering") so as to avoid a localised consumption of the contact shoe of the pantograph and prevent the contact wire from very dangerously coming out from the pantograph while turning.

The overhead contact line comprises, in addition to the at least one contact wire that runs along the line parallel to the ground, at least one suspension wire which has the main task of fastening the line with a series of supporting poles disposed at regular intervals along the line. The poles have in general a lattice or single portal-structure. The suspension wire is called "catenary" since, due to its weight, between one pole and the next, it forms the geometrical curve of the same name. Since it is made from metal, the catenary also generally has the function of supplementary electrical conduction element with respect to the contact wire. Spaced apart at more or less regular intervals along the catenary there are hanger wires that are disposed vertically, called "drop wires", which connect the contact wire to the catenary so as to keep the first at a height that is substantially constant with respect to the ground. The drop wires therefore have a variable length since they must connect a substantially horizontal element to an element in the form of a catenary. The length of the drop wires and their distance from one another is accurately calculated so as to ensure that the contact wire is substantially horizontal. This is particularly important in the case of high speed railway lines, since even a slight variation in the height of the contact wire could cause the contact shoe to become detached from the wire itself and therefore cause abrupt interruptions of the power supply. This can have also serious consequences, which range from simple sparks to the opening of the high-speed protection switch of the means of rail transport if there is a certain degree of detachment, with consequent stopping of the train. The drop wires of conventional lines are generally made from single wire rods, which are usually made from copper. For high speed lines, due to the considerable mechanical stress that occurs when a train passes, the drop wires are generally made from wires with small dimensions (the most common ones have a section equal to 10 or 16 $mm^2$).

The role of the drop wires in keeping the height of the contact wire constant is of course crucial, therefore they must have high tensile and compressive strength and high fatigue strength following repeated stress. Indeed, when the train is passing, the catenary, under the force of the pantograph, considerably rises, taking up the so called "humpback" shape, deforms and oscillates, therefore the drop wires must overcome such repeated stress without breaking, so as to avoid frequent maintenance operations on the overhead line.

Currently, drop wires are made from metal wires made up from a copper/magnesium (Cu/Mg) alloy, which makes it possible to obtain the fatigue strength required in the specifications devised by the railway regulators and by the companies that build and manage the railway lines. Cu/Mg alloy is generally an alloy containing from 0.3 to 0.5% by weight of Mg, according to Table I of standard DIN 17666 (CuMg0.4). Although their fatigue strength is considered sufficient, Cu/Mg alloys have poor electrical conductivity (in general Cu/Mg04 alloy has an electrical conductivity of around 63% IACS), and this constitutes a drawback since the drop wires not only carry out a mechanical function of connecting the catenary and the contact wire, but also an electrical function. Indeed, they must allow electric current to pass from the contact wire to the catenary, which, as explained above, also has the task of transporting the current along the overhead line. The use of pure copper, provided with optimal electrical conductivity, is rarely adopted for high speed lines due to the fact that it is a metal having poor mechanical strength, especially fatigue strength, whereas steel in not suitable for manufacturing drop wires since it has an insufficient level of electrical conductivity, which could only be increased by increasing the section of the hanger wire and therefore its weight.

The Applicant has thus tackled the problem of making hanger wires (drop wires) of the contact wire of overhead railway lines, in particular for high-speed railway lines, which are provided with high mechanical performance, in particular in terms of tensile and compressive strength and fatigue strength, and at the same time with high electrical conductivity. Such a result should not be obtained at the expense of the lightness of the drop wire itself, since an increase in its weights per unit length would cause there to be an increase in the overall weight of the overhead line, with obvious worsening of the drawbacks in terms of mechanical stress the line itself undergoes, both in static conditions and, especially, in dynamic conditions, i.e. when the train passes.

The Applicant has now found that it is possible to solve the aforementioned technical problem with the construction of a hanger wire that combines wires made from copper or an alloy thereof with wires consisting of a steel core coupled with a layer made from copper or an alloy thereof. Such a combination of different wires makes it possible to obtain high mechanical strength and fatigue strength, without jeopardising the electrical conductivity of the hanger wire and without increasing its weight.

According to a first aspect, the present invention thus concerns a hanger wire (drop wire) for contact wires of railway electrical lines, which comprises first wires made from copper or an alloy thereof combined with second wires consisting of a steel core coupled with a layer made from copper or an alloy thereof.

In a preferred embodiment, said hanger wire comprises a plurality of strands obtained by stranding said first wires combined with said second wires.

In a preferred embodiment, said hanger wire comprises a radially external crown of strands having said second wires in a radially external position and at least one strand, in a radially internal position with respect to said crown, having said first wires in a radially external position.

As far as the first wires are concerned, these are made from copper or an alloy thereof, for example copper in alloy with at least one metal selected from: magnesium, silicon, nickel, aluminium, zirconium, beryllium, zinc, tin. Oxygen-free copper is particularly preferred.

As far as the second wires are concerned, these consist of a steel core coupled with a layer made from copper or an alloy thereof. The cladding is generally made by solid state coupling of the steel core on which at least one strip made from copper or an alloy thereof is disposed. The coupling is carried out at high pressure and at high temperature so as to obtain a metallurgical bond between the two metals. The interdiffusion thickness between copper and steel is of around 50-100 nm. Such a bond at the atomic level makes it possible to avoid the formation of cracks, in particular at the welds between the strips of copper, which could arise following repeated mechanical stress, especially bending stress. The wire thus obtained, generally having a diameter of around 10 mm, can then be subjected to subsequent wire drawing steps until the desired dimensions are obtained.

Wires of this type are manufactured by Fushi Copperweld Inc. and sold under the trademark Copperweld® CCS. Preferably, said wires have a diameter of from 0.1 mm to 1.0 mm, more preferably from 0.2 mm to 0.6 mm. The steel core preferably consists of high-carbon steel, in particular with a carbon content that is equal to or greater than 0.10%, preferably equal to or greater than 0.20%.

The thickness of the cladding in copper or alloy thereof is preferably of between 1 and 30%, more preferably between 3 and 15%, with respect to the overall diameter of the wire.

Preferably, the hanger wire consists of a plurality of strands with a 1+6 configuration, that is to say a central wire and six wires wound around said central wire.

The hanger wire according to the present invention preferably has a winding pitch of the wires of each strand so as to ensure good flexibility to the product, in accordance with standard DIN 43138. For such a purpose, in general the winding pitch of the wires of each strand can vary from between 5 to 50 times, more preferably from 10 to 40 times, with respect to the overall diameter of the strand. The winding pitch of the strands making up the hanger wire can vary from 3 to 60 times, more preferably from 5 to 45 times, with respect to the overall diameter of the hanger wire.

The strands can advantageously be disposed around a central element made from polymeric material, for example one or more wires stranded together in polypropylene or other polymers with high mechanical strength.

In one particularly advantageous embodiment, the hanger wire comprises three central strands having said first wires (in copper or an alloy thereof) in a radially external position, and a radially external crown consisting of nine strands having said second wires (consisting of a steel core coupled with a layer made from copper or an alloy thereof) in a radially external position.

In another particularly advantageous embodiment, the hanger wire comprises a first radially internal crown consisting of six strands having said first wires (in copper or an alloy thereof) in a radially external position and a second radially external crown consisting of twelve strands having said second wires (consisting of a steel core coupled with a layer made from copper or an alloy thereof) in a radially external position.

In the case of wires made with more than one crown of strands, the strands of each crown are preferably disposed with a winding direction that is opposite with respect to the adjacent crown, with the purpose of ensuring that the hanger wire is compact and preventing it from fraying at the ends.

In another preferred embodiment of the hanger wire in accordance with the present invention, this comprises a central strand, having said first wires (in copper or an alloy thereof) in a radially external position, and a crown of six outer strands, of which four strands have said second wires (consisting of a steel core coupled with a layer made from copper or an alloy thereof) in a radially external position, the remaining two strands having said first wires (in copper or an alloy thereof) in a radially external position.

In a further aspect, the present invention concerns an overhead contact line that is suitable for transmitting electric power to a locomotive, which comprises:

at least one threadlike conductor element that is connected to an electric energy distribution network;

at least one suspension wire fastened to a series of supporting poles disposed along the line;

a plurality of hanger wires (drop wires) connecting said at least one threadlike conductor element to said at least one suspension wire;

in which said hanger wires are made in accordance with the present invention.

The present invention shall now be further illustrated with particular reference to the following figures, in which.

Figure 1:
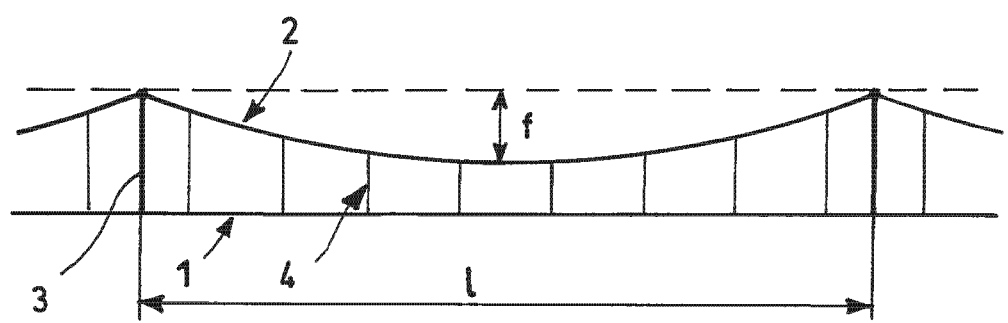
FIG. 1 is a schematic representation of an overhead contact line in accordance with the present invention.

With reference to FIG. 1, such a figure is a schematic representation of an overhead contact line in accordance with the present invention, comprising at least one thread-like conductor element (1) (also called "contact wire"), which is disposed in a substantially parallel position with respect to the ground and that is connected to an electric energy distribution network, and at least one suspension wire (2) (also called "catenary") that is fastened to a series of supporting poles (3) that are disposed along the line. The poles, in general, have a trestlework structure or a single portal. The suspension wire (2) is arranged according to a catenary having a span of length 1 and arrow f.

The contact wire (1) is connected to the suspension wire (2) through a plurality of hanger wires (drop wires) (4) made according to the present invention. The drop wires (4) have lengths that can vary as a function of the distance between the contact wire (1), disposed horizontally, and the suspension wire (2). They are connected to the contact wire (1) and to the suspension wire (2) through suitable clamps.

Figure 2:
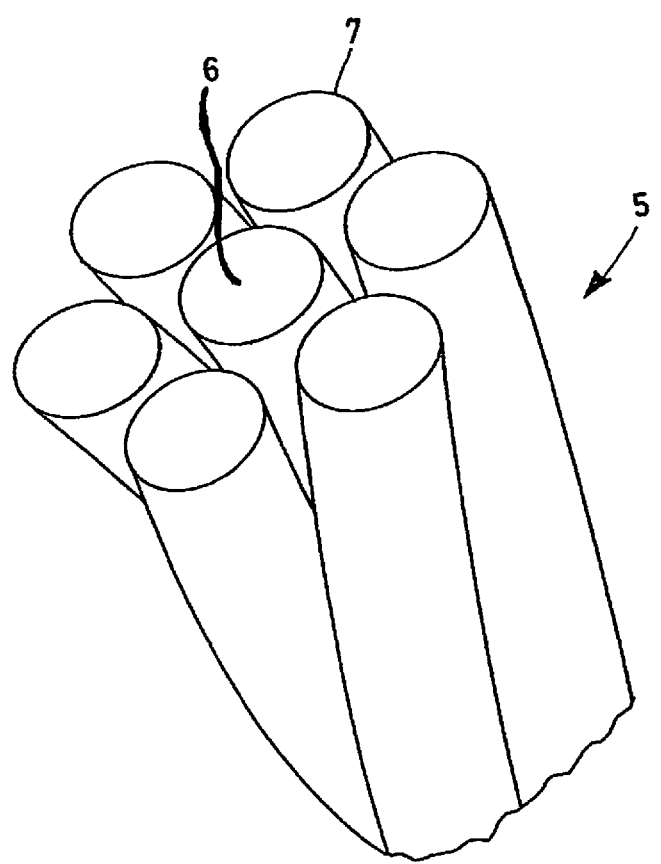
FIG. 2 is a perspective view of a strand that can be used in the hanger wire in accordance with the present invention consisting of first wires made from copper or an alloy thereof.

FIG. 2 is a perspective view of a first strand (5) that can be used in the hanger wire in accordance with the present invention, preferably as a radially internal element of the hanger wire itself. The strand (5) has a 1+6 configuration and it is made up of a central wire (6) around which six external wires (7) are wound, having the same diameter as the central wire (6). In the representation of FIG. 2 all the wires (6, 7) are made from copper or an alloy thereof. Alternatively, the central wire (6) can be made up of a steel core that is coupled with a layer made from copper or an alloy thereof, whereas the external wires (7) are made from copper or an alloy thereof.

Figure 3:
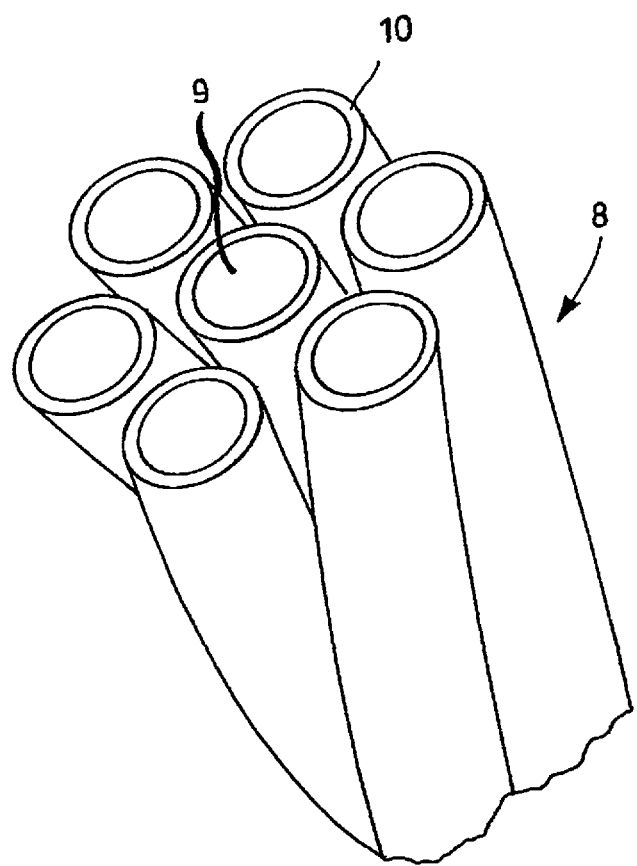
FIG. 3 is a perspective view of a strand that can be used in the hanger wire in accordance with the present invention consisting of second wires consisting of a steel core coupled with a layer made from copper or an alloy thereof.

FIG. 3 is a perspective view of a second strand (8) that can be used in the hanger wire in accordance with the present invention, preferably as a radially external element of the hanger wire itself. The strand (8) is made up of a central wire (9) around which six external wires (10) are wound, having the same diameter as the central wire (9). In the representation of FIG. 3 all the wires (9, 10) consist of a steel core coupled with a layer made from copper or an alloy thereof. Alternatively, the central wire (9) can be made up of copper or an alloy thereof, whereas the external wires (10) consist of a steel core coupled with a layer made from copper or an alloy thereof.

Figure 4:
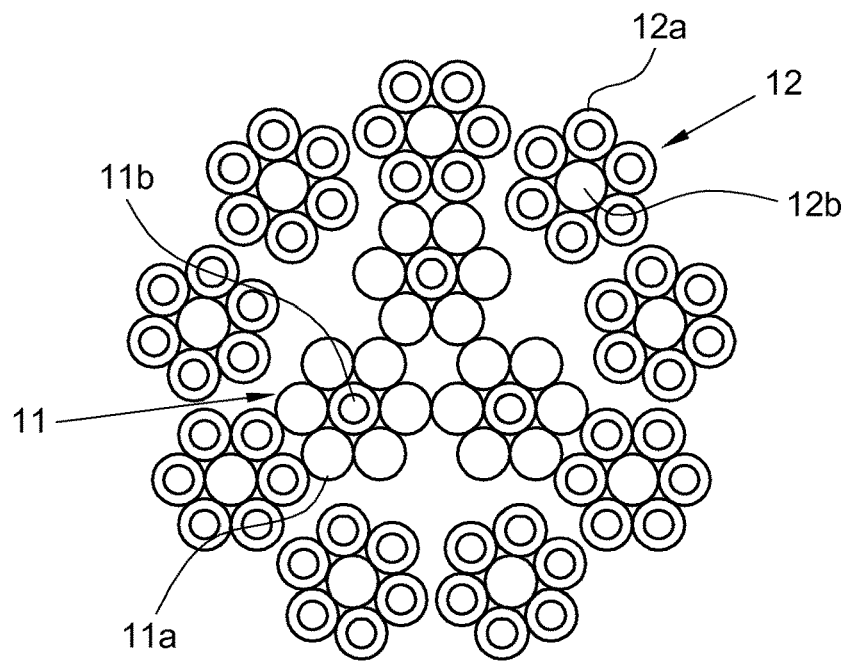
FIG. 4 is a cross-section view of a first preferred embodiment of the hanger wire in accordance with the present invention.

With reference to FIG. 4, according to a first preferred embodiment, a hanger wire in accordance with the present invention consists of three central strands (11) and nine external strands (12). Each of the central strands (11) has, in a radially external position, wires (11a) in copper or an alloy thereof (each represented in FIG. 4 with a circle), whereas the internal wire (11b) (represented in FIG. 4 with two concentric circles) is made up of a steel core that is coupled with a layer made from copper or an alloy thereof. Alternatively, the internal wire (11b) can also be made up of copper or an alloy thereof.

As far as the external strands (12) are concerned, these have wires (12a), in a radially external position, consisting of a steel core that is coupled with a layer made from copper or an alloy thereof, whereas the internal wire (12b) is preferably made up of copper or an alloy thereof.

Figure 5:
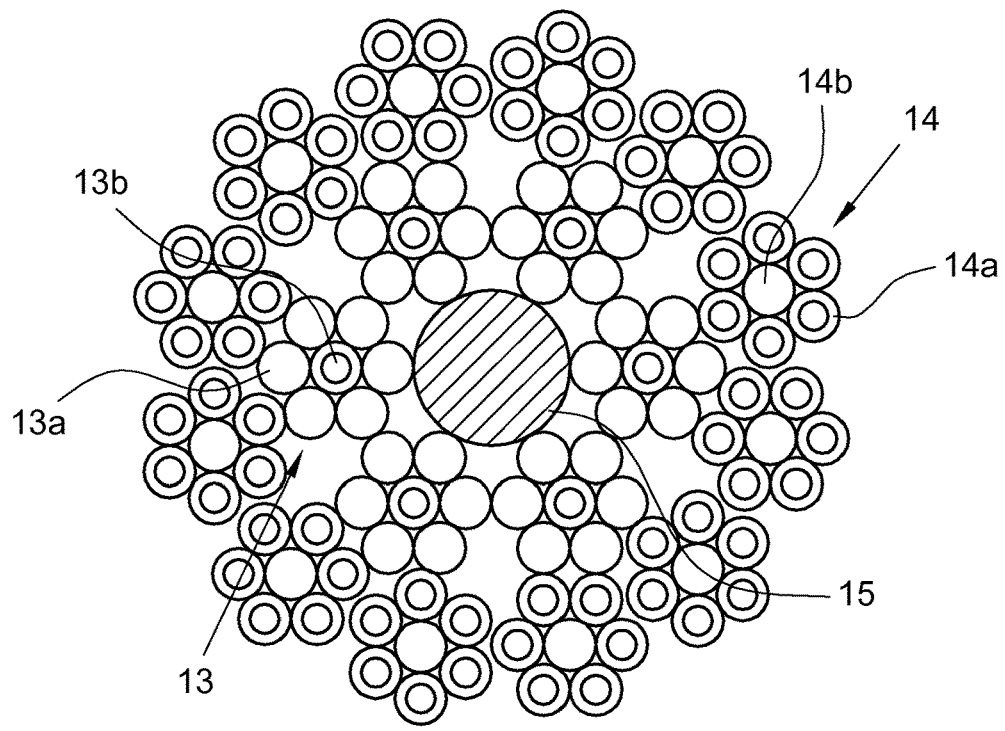
FIG. 5 is a cross-section view of a second preferred embodiment of the hanger wire in accordance with the present invention.

FIG. 5 represents a second preferred embodiment of the hanger wire in accordance with the present invention. Such a hanger wire consists of a first radially internal crown consisting of six strands (13) and of a second radially external crown consisting of twelve strands (14).

Each of the strands (13) of the first crown has, in a radially external position, wires (13a) in copper or an alloy thereof (each represented in FIG. 5 with a circle), whereas the internal wire (13b) (represented in FIG. 5 with two concentric circles) is made up of a steel core that is coupled with a layer made from copper or an alloy thereof. Alternatively, the internal wire (13b) can also be made from copper or an alloy thereof.

Concerning now the second crown, this consists of strands (14) that have wires (14a) in a radially external position that consist of a steel core coupled with a layer made from copper or an alloy thereof. Preferably, the internal wire (14b) is made up of copper or an alloy thereof (as represented in FIG. 5). Alternatively, also the internal wire (14b) is made up of a steel core that is coupled with a layer made from copper or an alloy thereof.

In a radially internal position with respect to the second crown, there is preferably an elongated element (15) made from polymeric material, made up for example from one or more wires, possibly stranded to one another, in polypropylene or other polymers with high mechanical strength. Alternatively, the elongated element (15) can be replaced with a central strand having the same construction as the strands of the first crown or of the second crown.

Figure 6:
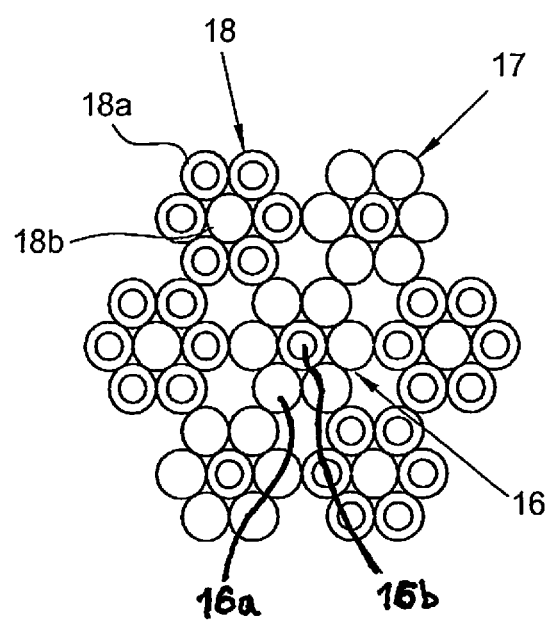
FIG. 6 is a cross-section view of a further preferred embodiment of the hanger wire in accordance with the present invention.

FIG. 6 represents a further preferred embodiment of the hanger wire in accordance with the present invention, which consists of a central strand (16) and a crown of six external strands (17, 18). The central strand (16) has, in a radially external position, wires (16a) in copper or an alloy thereof (each represented in FIG. 6 with a circle), whereas the internal wire (16b) (represented in FIG. 6 with two concentric circles) is made up of a steel core that is coupled with a layer made from copper or an alloy thereof.

The external crown consists of two strands (17) that are identical to the central strand (16) and of four other strands (18), each of which is formed by external wires (18a) consisting of a steel core that is coupled with a layer made from copper or an alloy thereof (represented in FIG. 6 with two concentric circles), whereas the internal wire (18b) (represented in FIG. 6 with a circle) consists of copper or an alloy thereof. This embodiment is particularly advantageous in the case in which it is desired to make a hanger wire with a relatively small section, for example 10 mm$^2$.

EXAMPLE 1

A hanger wire was made in accordance with the present invention, having the configuration represented in the attached FIG. 4.

The central strands, having a 1+6 configuration, were made from six identical external wires, in oxygen-free copper, having a nominal diameter of 0.5 mm, and from an internal wire consisting of a high-carbon steel core coupled with a layer made from oxygen-free copper (Copperweld® CCS(40%) HS-HD product, having nominal diameter equal to 0.5 mm).

The external strands, also with a 1+6 configuration, were made from six external wires of the Copperweld® CCS (40%) HS-HD type indicated above, whereas the internal wire consisted of oxygen-free copper (nominal diameter 0.5 mm).

A sample of the hanger wire underwent the following measuring operations:

electrical resistance, determined according to standard IEC 60468;

breaking load (minimum value), determined according to standard UNI EN 10002-1.

The results are shown in Table 1.

EXAMPLE 2

A hanger wire in accordance with the present invention was made, having the configuration represented in the attached FIG. 5.

The strands of the first (internal) crown, having a 1+6 configuration, were made from six identical external wires, in oxygen-free copper, having a nominal diameter of 0.41 mm, and from an internal wire made up of a high carbon steel core that was coupled with a layer made from oxygen-free copper (Copperweld® CCS(40%) HS-HD product, having a nominal diameter that was equal to 0.41 mm).

The strands of the second (external) crown, also having a 1+6 configuration, consisted of six external wires of the Copperweld® CCS(40%) HS-HD type, indicated above, and an internal wire made from oxygen-free copper.

The hanger wire moreover had a central elongated element that was made up of wires made from polypropylene.

A sample of the hanger wire underwent the same measuring operations as in Example 1. The results are shown in Table 1.

EXAMPLE 3

Comparative

A hanger wire was made having a configuration that was identical to the one represented in the attached FIG. 4, except for the fact that all the strands, having a 1+6 configuration, were made from identical wires in copper/magnesium alloy (Cu/Mg0.4), having a nominal diameter of 0.5 mm.

A sample of the hanger wire underwent the same measuring operations as in Example 1. The results are shown in Table 1.

EXAMPLE 4

Comparative

A hanger wire was made having a configuration that was identical to the one represented in the attached FIG. 4, except for the fact that all the strands, having a 1+6 configuration, were made from identical wires, in Copperweld® CCS(40%) HS-HD, having a nominal diameter of 0.5 mm.

A sample of the hanger wire underwent the same measuring operations as in Example 1. The results are shown in Table 1.

EXAMPLE 5

A hanger wire in accordance with the present invention was made, having the configuration represented in the attached FIG. 6.

The central strand, having a 1+6 configuration, consisted of six identical external wires, made from oxygen-free copper, having a nominal diameter of 0.5 mm, and an internal wire consisting of a high-carbon steel core that was coupled with a layer made from oxygen-free copper (Copperweld® CCS(40%) HS-HD product, having a nominal diameter equal to 0.5 mm).

Two of the external strands, forming the external crown, were identical to the central strand, whereas the other four strands, also with a 1+6 configuration, were made from six external wires of the Copperweld® CCS(40%) HS-HD type indicated above, whereas the internal wire was made up of oxygen-free copper (nominal diameter 0.5 mm).

A sample of the hanger wire underwent the same measuring operations as in Example 1. The results are shown in Table 1.

TABLE 1

| | EXAMPLE | | | | |
|---|---|---|---|---|---|
| | 1 | 2 | 3 (*) | 4 (*) | 5 |
| Section ($mm^2$) | 16.5 | 16.6 | 16.5 | 25.4 | 9.6 |
| Wire Diameter (mm) | 0.5 | 0.41 | 0.5 | 0.62 | 0.5 |
| Strand Diameter (mm) | 6.2 | 6.2 | 6.2 | 7.7 | 4.5 |
| Electrical resistance ($\Omega$/km) | 1.79 | 1.71 | 1.73 | 1.73 | 2.75 |
| Breaking load ($N/mm^2$) | 620 | 630 | 589 | 710 | 566 |
| Linear weight (kg/km) | 140 | 145 | 150 | 210 | 83 |

(*) comparative

What is claimed is:

1. A hanger wire for contact wires of railway electrical lines, the hanger wire comprising:
    one or more internal strands, wherein an individual internal strand comprises:
        a first internal wire, wherein the first internal wire comprises a steel core clad with a layer of copper or a second alloy of copper; and
        a first set of external wires disposed around the first internal wire, wherein the first set of external wires comprise copper or a first alloy of copper; and
    external strands disposed around the one or more internal strands, wherein an individual external strand comprises:
        a second internal wire, wherein the second internal wire comprises copper or a first alloy of copper; and
        a second set of external wires disposed around the second internal wire, wherein the second set of external wires comprise a steel core clad with a layer of copper or a second alloy of copper;
    wherein in the first internal wire and the second set of external wires, the layer of copper or the second alloy of copper has a thickness greater than or equal to 3% and less than or equal to 15% with respect to an overall diameter of the first internal wire and individual ones of the second set of external wires; and
    wherein the first and second internal wires and the first and second set of external wires of a respective internal or external strand has a winding pitch greater than or equal to 10 times and less than or equal to 40 times with respect to an overall diameter of the respective internal or external strand.

2. The hanger wire of claim 1, wherein the strands have a 1+6 configuration.

3. The hanger wire of claim 1, wherein the first internal wire and the second set of external wires are obtained by solid state coupling of the steel core with at least one strip made from copper or the second alloy of copper.

4. The hanger wire of claim 1, wherein the first internal wire and the second set of external wires have a diameter greater than or equal to 0.1 millimeters (mm) and less than or equal to 1.0 mm.

5. The hanger wire of claim 1, wherein the strands are around a central element of polymeric material.

6. The hanger wire of claim 1, wherein the first alloy of copper is the same as the second alloy of copper.

7. The hanger wire of claim 1, wherein the first alloy of copper comprises copper in alloy with at least one of magnesium, silicon, nickel, aluminum, zirconium, beryllium, zinc, or tin.

8. The hanger wire of claim 1, wherein the first internal wire and the second set of external wires have a diameter greater than or equal to 0.2 millimeters (mm) and less than or equal to 0.6 mm.

\* \* \* \* \*